/

US006985877B1

(12) United States Patent
Hayward et al.

(10) Patent No.: US 6,985,877 B1
(45) Date of Patent: *Jan. 10, 2006

(54) METHOD FOR SUPPLY ORDERING (75) Inventors: Ken Hayward, Brockport, NY (US); Marc J. Krolczyk, Rochester, NY (US); Dawn M. Marchionda, Marion, NY (US)

(73) Assignee: Xerox Corporation, Stamford, CT (US)

( * ) Notice: Subject to any disclaimer, the term of this patent is extended or adjusted under 35 U.S.C. 154(b) by 188 days.

This patent is subject to a terminal disclaimer.

(21) Appl. No.: 09/662,284

(22) Filed: Sep. 14, 2000

Related U.S. Application Data (63) Continuation-in-part of application No. 09/397,126, filed on Sep. 16, 1999.

(51) Int. Cl.
*G06F 17/60* (2006.01)
(52) U.S. Cl. ............................ 705/27; 705/26; 399/12; 399/24
(58) Field of Classification Search .................. 705/26, 705/27; 399/12, 24
See application file for complete search history.

(56) References Cited

U.S. PATENT DOCUMENTS

| | | | |
|---|---|---|---|
| 4,496,237 A | 1/1985 | Schron ...................... 355/14 C |
| 4,961,088 A | 10/1990 | Gilliland et al. ............ 355/206 |
| 5,016,171 A | 5/1991 | Connolly et al. ........... 364/406 |
| 5,281,999 A | 1/1994 | Edmunds .................... 355/202 |
| 5,283,613 A | 2/1994 | Midgley, Sr. ............... 355/203 |
| 5,305,199 A * | 4/1994 | LoBiondo et al. .......... 363/403 |
| 5,445,295 A * | 8/1995 | Brown .......................... 221/3 |
| 5,572,292 A | 11/1996 | Chatani et al. ............... 399/25 |
| 5,636,032 A | 6/1997 | Springett .................... 358/296 |
| 5,802,420 A | 9/1998 | Garr et al. ..................... 399/27 |
| 5,809,375 A | 9/1998 | Owens, Jr. et al. ......... 399/111 |
| 5,828,864 A | 10/1998 | Danknick et al. ........... 395/500 |
| 5,835,817 A * | 11/1998 | Bullock et al. ............... 399/25 |
| 5,896,497 A | 4/1999 | Halstead ...................... 395/186 |
| 5,901,286 A | 5/1999 | Danknick et al. ...... 395/200.33 |
| 6,000,773 A | 12/1999 | Murray et al. ................. 347/7 |
| 6,003,078 A * | 12/1999 | Kodimer et al. ............ 709/224 |
| 6,016,409 A | 1/2000 | Beard et al. ................... 399/33 |
| 6,018,719 A | 1/2000 | Rogers et al. ................. 705/24 |
| 6,045,206 A | 4/2000 | Igval ............................. 347/2 |
| 6,065,824 A * | 5/2000 | Bullock et al. ............... 347/19 |
| 6,106,088 A | 8/2000 | Wafler ........................... 347/7 |
| 6,108,099 A | 8/2000 | Ohtani ...................... 358/1.15 |
| 6,113,208 A | 9/2000 | Benjamin et al. .............. 347/7 |
| 6,141,507 A * | 10/2000 | Sawada .......................... 399/8 |
| 6,158,837 A | 12/2000 | Hilton et al. ................. 347/19 |
| 6,170,007 B1 * | 1/2001 | Venkatraman et al. ...... 709/218 |
| 6,204,763 B1 * | 3/2001 | Sone ....................... 340/568.1 |

(Continued)

FOREIGN PATENT DOCUMENTS

EP 0 838 768 A2 * 4/1996

(Continued)

OTHER PUBLICATIONS

M2 PRESSWIRE, Lexmark extends powerful printer-mangement capabilities to printers from all major brands, Sep. 30, 1998. M2 Communications Ltd. World reporter.*

(Continued)

*Primary Examiner*—Mark Fadok
(74) *Attorney, Agent, or Firm*—Andrew D. Ryan (57) ABSTRACT

A method of automatic supply ordering system for electronically ordering a consumable part or replaceable part in a marking machine. The system provides electronic identification of a condition of a replaceable component and automatically electronically sends an offer to purchase a replacement part upon identification of a threshold condition.

19 Claims, 7 Drawing Sheets

U.S. PATENT DOCUMENTS

| | | | |
|---|---|---|---|
| 6,209,048 B1 * | 3/2001 | Wolff | 710/62 |
| 6,233,408 B1 * | 5/2001 | Allen | 399/8 |
| 6,233,409 B1 * | 5/2001 | Haines et al. | 399/10 |
| 6,264,301 B1 * | 7/2001 | Helterline et al. | 347/19 |
| 6,271,928 B1 * | 8/2001 | Bullock et al. | 358/1.16 |
| 6,289,371 B1 | 9/2001 | Kumpf et al. | 709/203 |
| 6,293,144 B1 * | 9/2001 | Froger et al. | 73/304 |
| 6,295,423 B1 * | 9/2001 | Haines et al. | 399/24 |
| 6,302,527 B1 * | 10/2001 | Walker | 347/86 |
| 6,312,106 B1 * | 11/2001 | Walker | 347/50 |
| 6,333,790 B1 * | 12/2001 | Kageyama | 358/1.15 |
| 6,629,134 B2 | 9/2003 | Hayward et al. | 709/217 |
| 6,798,997 B1 * | 9/2004 | Hayward et al. | 399/12 |

FOREIGN PATENT DOCUMENTS

| | | |
|---|---|---|
| EP | 0 838 768 A2 | 4/1998 |
| EP | 0 843 229 A2 | 5/1998 |
| WO | WO 99 06910 | 2/1999 |
| WO | WO 99 17210 | 4/1999 |

OTHER PUBLICATIONS

IDOCs ; Linking the worlds of print and electronic media, PN102059-01 Sep. 11, 1998.*

"Disk Drive with Embedded Hyper-Text Markup Language Server" IBM Technical Disclosure Bulletin, IBM Corp., New York, U.S. vol. 38, No. 12, Dec. 1, 1995. p. 479.

M2 PRESSWIRE, Lexmark extends powerful printermanagement capabilities to printers from all major brands, Sep. 30, 1998. M2 Communications Ltd. World reporter.

U.S. Appl. No. 09/662,198, filed Sep. 14, 2000.

EPO Search Report mailed May 6, 2002 for Application No. 00307969.6-1238 (4 pages).

Digital Signature Standard (DSS); U.S. Department of Commerce/National Institute of Standards and Technology; Jan. 27, 2000; 76 pages.

Fips Pub 186—Digital Signature Standard (DSS); U.S. Department of Commerce/National Institute of Standards and Technology; May 19, 1994; 17 pages.

* cited by examiner

METHOD FOR SUPPLY ORDERING

This application is a continuation-in-part of U.S. application Ser. No. 09/397,126, filed Sep. 16, 1999, the disclosure of which is totally incorporated by reference.

FIELD OF THE INVENTION

This invention relates to a method of intelligent ordering for replacement consumable parts in imaging and marking apparatus. Reference is also made to co-pending continuation-in-part application, Ser. No. 10/736,269, entitled, SUPPLY ORDERING APPARATUS, filed concurrently herewith. The present application also relates to U.S. application Ser. No. 09/397,125, filed Sep. 16, 1999. The above applications are incorporated herein by reference in their entireties.

BACKGROUND OF THE INVENTION

Many imaging machines including, for example, fax, copier, printer, scanner device, xerographic device, electrostatographic device generally provide user assistance that indicate one or more error conditions. For example, lights such as small LCD (liquid crystal display) often indicate a variety of error conditions. Typically, a user reads an error code from the LCD, looks up the error code in a machine's user manual, and then calls the manufacturer's toll free help line for an explanation of the code or instructions on what to do to fix the error condition.

Figure 1:
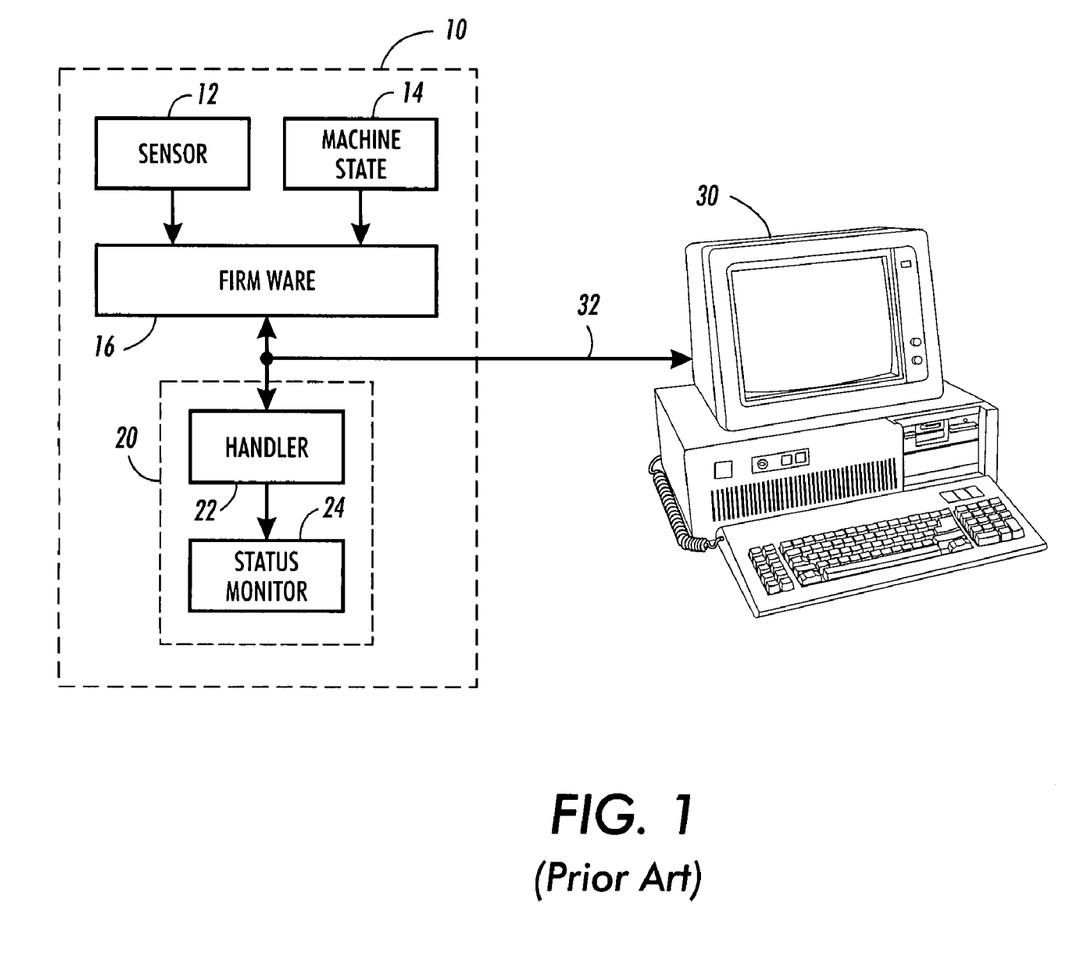
FIG. 1 is a block diagram of a user interface of a known computer peripheral.

FIG. 1 depicts a typical machine 10 connected to a known computer 30 over a bus 32. Machine 10 includes sensors 12 to detect conditions (e.g., paper tray empty). Sensors 12 and machine state flags 14 (e.g., warm up or not ready) describe the state of the machine. Firmware 16 reads the state of the machine and forms an error code number. A code handler 22 of user interface 20 receives the error code and causes it to be displayed on status monitor 24.

Various monitoring systems and machines are disclosed in U.S. Pat. Nos. 6,016,409; 6,106,088; 6,045,206; 6,000,773; 5,901,286; 5,809,375; 5,802,420; 5,636,032; 5,572,292; 5,305,199; 5,283,613, 5,281,999; 5,016,171; 4,961,088; and 4,496,237.

All documents cited herein, including the foregoing, are incorporated herein by reference in their entireties.

SUMMARY OF THE INVENTION

The present invention relates to a method for automatically ordering consumable supplies for a marking apparatus.

In accordance with one aspect of the present invention, there is provided, a method of ordering a part for a xerographic apparatus comprising: monitoring electronically a condition of a replaceable part in a first device, the replaceable part having: a first condition upon installation; at least one intermediate condition after use; and a third condition when a replacement part is substantially necessary; and electronically sending a signal to a second device, the signal automatically electronically offering to purchase a replaceable part upon identification of at least one of the first condition, second condition, and third condition in the replaceable part using an electronic signature.

In accordance with another aspect of the present invention, there is provided, a method of ordering a part for an apparatus including: identifying electronically a condition in an apparatus; and automatically launching an electronic communications to initiate at least one of an inquiry and an offer to purchase to a supplier based on the condition.

In accordance with another aspect of the present invention, there is provided, a method of ordering a part for a marking device including: sensing a condition at a consumable part in the marking device, the marking device adapted to at least one of identify and predict a code indicative of a threshold of a consumable; and launching an electronic communication to access a computer at an address defined by the condition for ordering a replacement for the consumable part.

In accordance with another aspect of the present invention, there is provided, a method of ordering a part for an imaging apparatus including: identifying electronically a condition in a consumable part, the consumable part including at least one an ink cartridge, toner cartridge, photoreceptor cartridge, paper, and printhead, the consumable part having a first condition upon installation, at least one intermediate condition after use, and a third condition when a replacement of the consumable part is substantially necessary; and using a software and sensor system associated with the apparatus for at least one of: (a) electronic monitoring of the condition of the consumable part; (b) electronic predicting of the condition of the consumable part; and after at least one of (a) and (b); (c) automatically launching an electronic communications to initiate at least one of an inquiry and an offer to purchase a replacement for the consumable part at an occurrence or prediction of at least one of the first condition, intermediate condition, and third condition.

Still other objects and advantages of the present invention will become readily apparent to those skilled in the art from the following detailed description, wherein embodiments are shown and described, simply by way of illustration contemplated of carrying out the invention. As will be realized, the invention is capable of other and different embodiments, and its several details are capable of modification in various obvious respects, all without departing from the invention. Accordingly, the drawing and description are to be regarded as illustrative in nature, and not as restrictive.

DETAILED DESCRIPTION OF THE INVENTION

While the principles and embodiments of the present invention will be described in connection with marking apparatus such as electrostatographic and xerographic reproduction machines, and their associated peripherals, it should be understood that the present invention is not limited to that embodiment or to that application. Therefore, it should be understood that the principles of the present invention and embodiments extend to all alternatives, modifications, and equivalents thereof.

Figure 2:
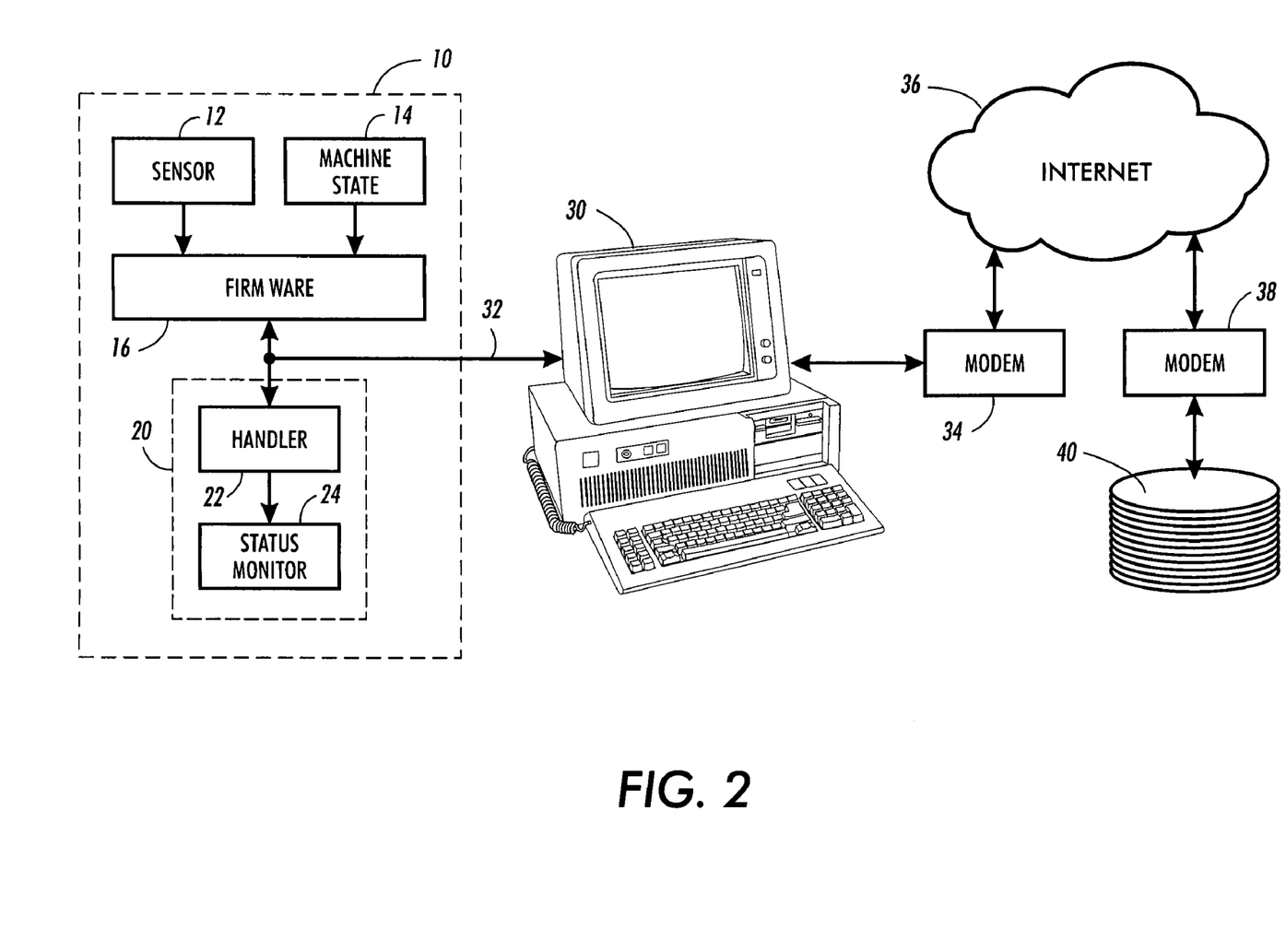
FIG. 2 is a block diagram of a user support system according to the present invention.

In FIG. 2, a computer 30 is connected to a modem 34 to convert computer binary information to analog telephone signals. Computer 30 may be a stand alone device or may be incorporated in a marking device such as a machine or peripheral 10. In addition, the marking device user may be connected to the Internet 36. Computer 30 has an Internet browser installed and operating thereon (i.e., a software module that runs on the computer to interface the user to the Internet). Internet 36 access may be through an Internet Service Provider (ISP). Typically, an ISP maintains a point of presence (POP) in the user's local telephone system to give the user a local telephone number to call. In this case, the modem 34 is a telephone modem, and under user control the browser causes modem 34 to place a call to the POP. The POP is linked to the IPS's main service center by trunk lines. The ISP's main service center has a bank of modems (not shown) to reconvert the analog telephone signals into computer binary information, and a computer (also not shown) to connect to the Internet backbone (a digital or binary communications system, also not specifically shown). The Internet backbone includes an Internet pier (i.e., terminal) where properly formatted digital signals from the ISPs main service center are launched onto the Internet backbone. The user, through his browser, may access any site on the Internet based on a URL. Everything from the POP to the Internet backbone is covered by the representation of Internet 36 in FIG. 2. Other communication systems and protocols may also be used to link the system to a user, supplier, vendor, manufacturer, or third party. For example, ISDN (integrated services digital network), DSL (digital subscriber line), and cable telephone systems may be used.

In addition, a user may communicate with a server 40 that is connected to the Internet through a modem 38. Modem 38 may be connected to the Internet either directly or indirectly through an ISP. The server 40 may perform a variety of functions, for example, a manufacturer may use their server 40 for registration of a new peripheral or publishing information about the peripheral.

A peripheral 10 (e.g.; fax, copier, printer and scanner device) may be sold to the user with installation software. The user may physically connect peripheral 10 to a computer 30, and then load and execute the installation software. In addition, the installation software may be loaded on the computer using an application program executed directly by the user to interact with the peripheral, and one or more driver modules (e.g., a printer driver) may be executed by another application program (e.g., a word processor).

In use, the installation software may execute a module that performs online registration. The online registration system may use a registration server of the manufacturer to provide the user with HTML formatted pages over the Internet for display on the computer 30. These pages include fields to be filled out by the user. For example, the fields may require the user's name, product name, model, and serial number. Later purchased options (e.g. additional paper trays or a document handler) may also be registered. The HTML formatted pages may also include a "send button" to be "clicked on" by the user to send the filled out fields to the registration server in order to complete the online registration.

Figure 5:
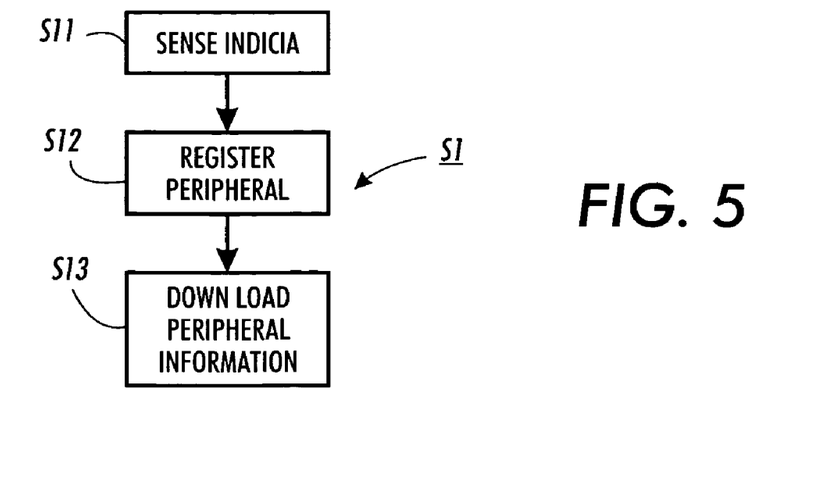
FIG. 5 is a flow chart of a registration process of the invention.

Turning now to FIG. 5, the installation process includes the computer 30 sensing an indicia (step S11) of machine 10 including the consumable components and reconfigurable parts. The machine 10 may include a variety of model numbers, part numbers, dates of manufacture, serial numbers, and configuration information. In addition, the indicia of machine 10 may include information such as the geographic location of the owner or location of the machine 10. Using the geographic information, the user may be routed to a particular sales site based on the geographic region. For example, users may be routed to a specific retailer, distributor, or company direct sales site depending on the location of the user, U.S. or foreign, and regional location within a certain country.

Registering the machine 10 (step S12) includes launching a communications link to connect to a registration server. The registration page is then displayed on the screen. The user fills out the information fields (e.g., the user name) and clicks on the send button. The completed registration page and the indicia of the peripheral are sent to the registration server. This results in information relating to precise configuration and date of the registered product being stored on the registration server.

At the end of online registration process S1, a file of additional information directed to the registered machine 10 is downloaded from the server (S13). The downloaded information is dependent on the peripheral indicia. In this way, the latest information on the registered machine 10 may be stored in the computer 30 or the processor, software and logic system 16, and the information is directed to the precise configuration and date of the registered product. After the initial registration, user support information (e.g., frequently asked questions) may be sent to the user as support information continues to evolve throughout the product's life cycle.

The specific indicia sent during registration may be used to identify user support information in the database most useful to the operation and maintenance of a machine having a particular serial number or configuration. This permits a user to update user support information at any time.

Conditions in the machine 10 may indicate a need to replace a consumable item or part (e.g., paper, ink, toner, cartridge, printhead, drum). Using the sensed indicia from registration, an automatic electronic customer direct supply ordering mechanism can advantageously identify a replacement part or consumable item that is needed and the proper part can then be automatically ordered and sent to the user.

For example, a particular condition may be determined or derived from sensors 12 and machine state 14 via firmware 16 as shown in FIG. 2. The peripheral condition is sent by firmware 16 over bus 32 to an application program running in the computer 30. Moreover, a particular condition may be determined or derived from sensors 12 and consumable component 11 via processor, software and logic system 16 as shown and further described with respect to FIG. 8. The applications program may indicate the particular condition to the user, for example on a display screen.

Figure 3:
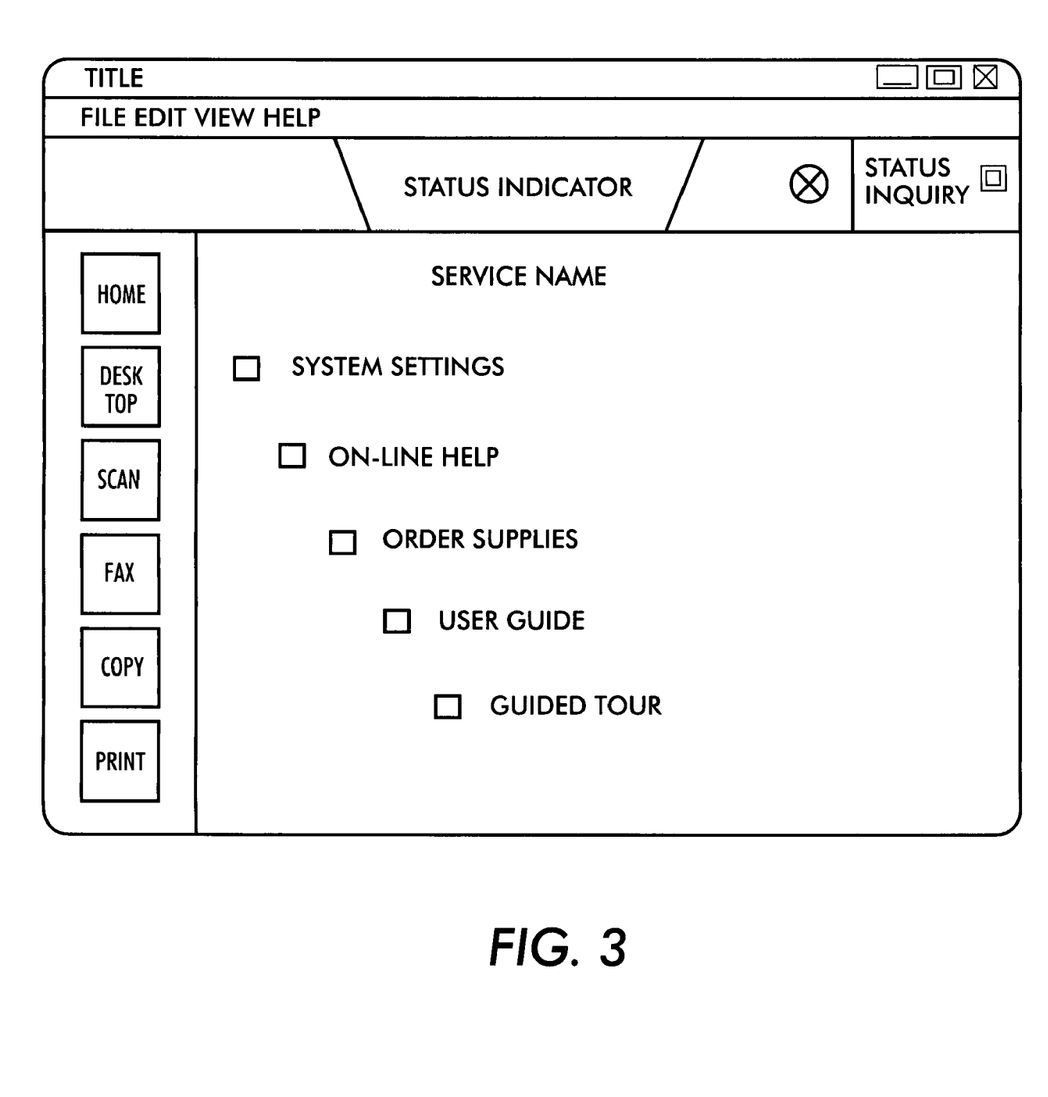
FIG. 3 is a view of a "home" screen display of an embodiment of the invention.

FIG. 3 depicts an example of a display screen for a fax, copier, printer, scanner device. Along the top line is the title of the application program, for example, "WorkStation" or "Device". The next line is a drop down menu bar. The next line includes information specific to the exemplary work station or device. The third line, for example, includes an X indicator to indicate that a status condition has occurred that should be reviewed, and a Status Inquiry box with "button" to "click on" and get more information. On the left hand side of the display is a vertical bar with six buttons that is referred to as a service panel. The remaining portion of the screen is a context sensitive work area that is dependent on the selected service. A software and user input solution automatically connects the user to a part supplier, a consumable item, manufacturer, or a consumable item vendor for efficiency, convenience, and timely ordering or inquiry.

The service panel may have any number of buttons. In one embodiment, six buttons may be incorporated. For example, the first button may return the operator to the home menu screen. The next button accesses a "desktop" directory used by the present application. The next four buttons, in succession, access a scanner screen, a fax screen, a copier screen, and a printer screen.

A variety of menu choices may be depicted in the context sensitive work area of the home screen. The first menu entry may access a screen to review or modify system settings. The second menu entry accesses a screen to access online help services and user support as described further herein. The third menu entry accesses a screen to order supplies and/or upgrades from the manufacturer or a manufacturer approved supplier. The fourth menu entry accesses a digital user manual with hyperlinked information and help files. The fifth menu entry accesses a simplified guided tour and interactive demonstration of the peripheral's operation. The system setting screen provides for setting up various device settings that would otherwise need hard buttons. Preferably, a link to maintenance and print driver setup screens is provided.

Figure 4:
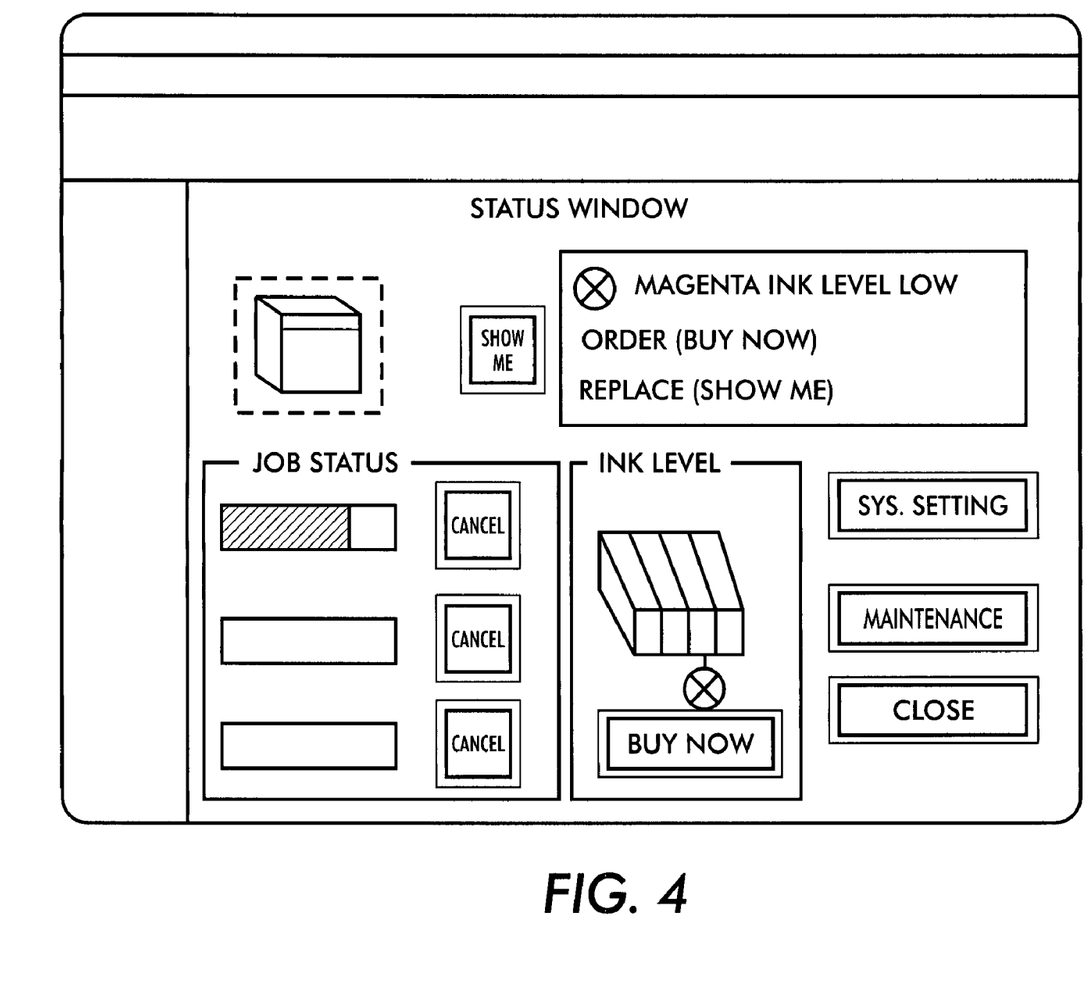
FIG. 4 is a view of a "status window" of a screen display of an embodiment of the invention.

FIG. 4 depicts the work area (i.e., status window) of the status screen. When the status inquiry button is clicked from a screen, the status screen window appears. The top of the status screen window includes two areas in the upper half: an icon display of the machine and a condition sub-window with a "Show Me" button. The icon shows the device in it's current state. If there is a problem (e.g. paper jam) it will indicate an error state. Pressing the "Show Me" button will run an animation of the icon showing how to clear the jam or correct a different problem. The animation data would be streamed from local memory or from a website. The user or machine condition can be used to determine which context sensitive help such as text, video, or audio communication to use from the website. A condition, for example, indicated by the X, explained as a "Magenta Ink Level Low", and two action options are given. The first option is ordering another magenta ink cartridge using the "Buy Now" button, and the second option is replacing the cartridge using the "Show Me" button.

For example, the bottom of the status window may include three areas in the lower half: a job status sub-window, an ink level sub-window with a "Buy Now" button, and three miscellaneous buttons (system settings as a short cut to change settings, maintenance button to access a diagnostics screen and a close button). The job status sub-window shows three jobs as an example, showing the portion completed. Preferably, some indicia of the job, such as a file name, is displayed under the portion completed. Next to each job is a cancel button that enables the user to optionally cancel the job.

It should be appreciated that the screens depicted in FIGS. 3 and 4 are representative screen embodiments, and are not meant to limit the invention defined by the claims.

Figure 6:
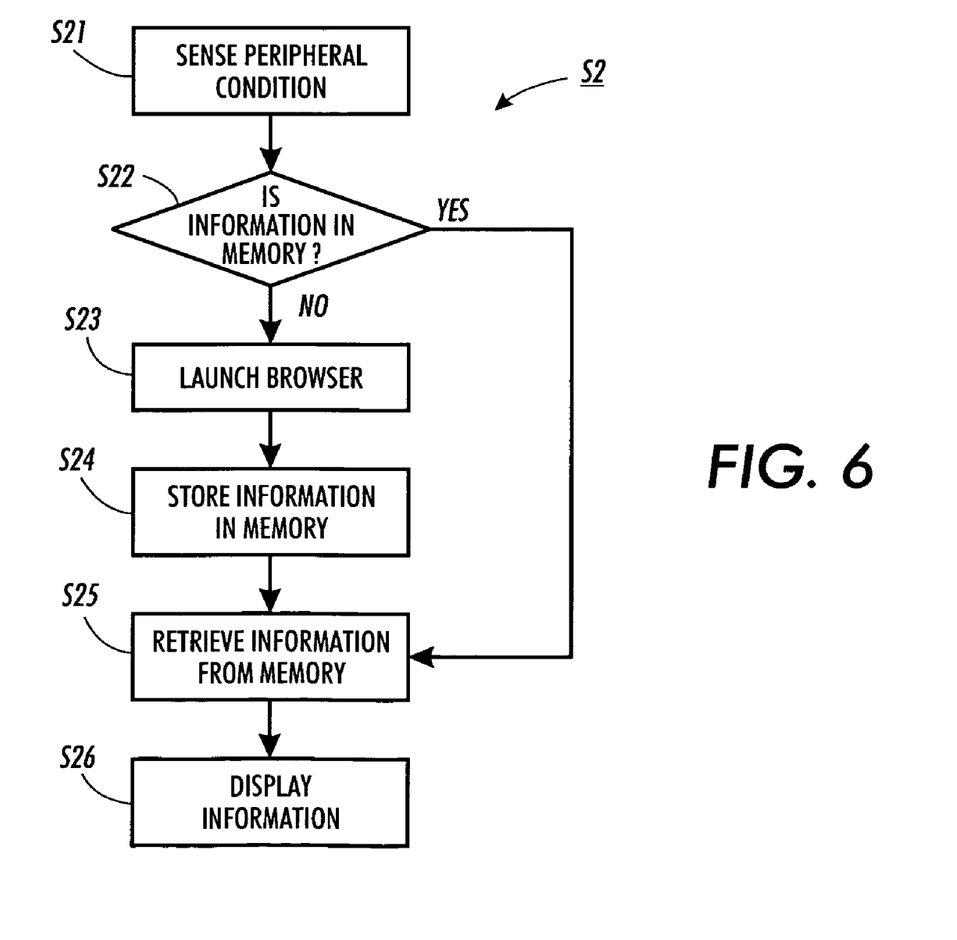
FIG. 6 is a flow chart of a user support information update process of the invention.

When a user accesses the status window and clicks the "Show Me" button, the application program may access replacement instruction information related to replacing a customer replaceable unit, for example, the magenta ink cartridge. FIG. 6 depicts this "Show Me" process as step S2. In step S21, the application program senses the particular peripheral condition. The application program running in computer 30 receives the peripheral condition over the bus 32 from the firmware 16 (FIG. 2). In step S22 (FIG. 6), the application program checks to see if the information is already present in the memory of computer 30. If the information is not present, the application program in step S23 launches an embedded or an external communications browser to access the manufacturer's server or vendor's server at an address defined by the peripheral condition. For example, the address might be:

www.manufacturer.com/product/xxx, where "product" is the peripheral indicia or something derivative therefrom, and "xxx" is the peripheral condition (i.e., magenta ink level low), code, or something derivative therefrom.

The browser accesses a web page on the manufacturer's server that is identified by "/product/xxx". In this way the information provided is not only specific to the product configuration of the peripheral as it exist in the product's life cycle, but is also specific to the particular condition sensed. Then, the server provides the browser with additional information about the condition which is stored temporarily in the computer's memory (step S24, FIG. 6). The additional information may be text, but preferably includes illustrations and even photographs. It may include audio clips (e.g., using .wav format) and it may include video segments using any of the available formats. A goal is to make it look to the user as if a technician on the other side of the computer screen is showing the user how to replace the magenta cartridge in the user's specific machine.

Audio and video clips require large storage areas. While it may be possible to store in the computer's memory a complete audio and video clip for several conditions, it is unlikely that all possible conditions will be economically storable in the computer's memory, although improvements in technology may solve this problem. However, a manufacturer's server, may be much larger and may include clips for all possible conditions, for each configuration of each product line that is supported.

In step S25, the additional information is retrieved from memory and in step S26 that information is displayed to the user. It should be appreciated that the memory of the computer 30 may include an area that is to be used to save the most frequently used "Show Me" files. For example, a memory area large enough to store 10 average sized "Show Me" files may be reserved in the computer's memory (e.g., a disk memory). A criteria for managing this memory area is established to fill the memory area when there is sufficient space for a new "Show Me" file, and to delete a past "Show Me" file to make room for a new "Show Me" file when needed dependent on the age of the file and the product cycle.

The server help database for a product line with a greater number of installed products will mature faster than for a product line with fewer number of installed products. The user has available information about the date of manufacture of the particular peripheral configuration that his own peripheral has, and this can be used to determine the time elapsed since manufacture as a suggestion of how many peripherals of this configuration have been sold. However, the manufacturer is in possession of actual information on how peripheral of the particular configuration have been sold, and thus how old a user help file needs to be to be consider stale. A combination of user and manufacturer information may be used to set a "stale threshold" for deleting a stale user help file. A second stale threshold may also be used in step S22. If the information stored in memory is available but regarded stale by according to the second threshold, step S22 may proceed to steps S23–S26 anyway to download the latest update on the user help information.

The user can click on a "maintenance" button. On doing so, a maintenance screen appears, and the user can select and execute any of several self diagnostic routines. The installation software installs a diagnostic module that is more or less and executive that calls very specific sub-modules to test each part of the machine. The specific diagnostic options depend on the specific configuration of the peripheral and are downloaded from server 40 in the exact same manner as user help information is downloaded. The present invention benefits from the use of the indicia and condition to specify a URL address that exactly matches the user's peripheral and condition. In this way, diagnostics may be performed quicker. Then, when a failed part is isolated, the "Buy Now" button appears and a replacement part may be ordered immediately or automatically as discussed below. The user may use the "Show Me" button to see how to replace the part when the part arrives.

Figure 7:
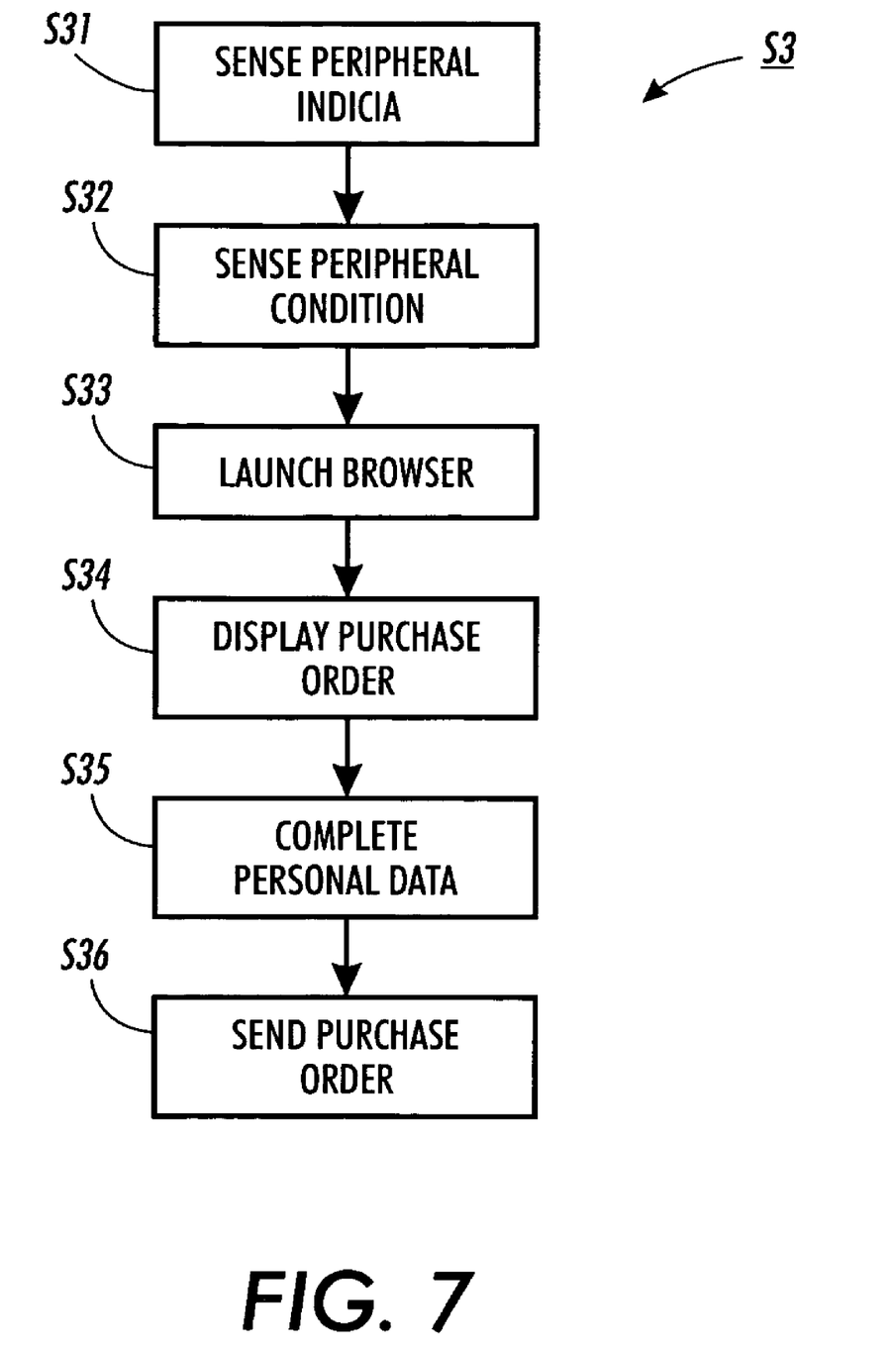
FIG. 7 is a flow chart of an online purchase order process of the invention.

When a user clicks on the "Buy Now" button, either from FIG. 4 or from a maintenance screen, the application program enters purchase order sequence S3 (FIG. 7). In FIG. 7, when the buy now button is clicked, the application program has already sensed the peripheral indicia S31 (as in S11, FIG. 5) and the peripheral condition S32 (as in S21, FIG. 6). Then at S33, the application program launches a browser to access a purchase order page or screen from the manufacturer's server 40 based on the peripheral indicia and the detected peripheral condition. The purchase order screen is automatically partially filled out at server 40 with the part number to be ordered based on the peripheral indicia and condition. At S34, the browser displays the screen to the user. At S35, the user selects such online purchasing options as method of shipment, payment on account or by credit card, etc. For example, the user may enter a credit card authorization and request overnight express shipment. When the user has filled out the purchase order screen, at S36 the browser sends the purchase order to the manufacturer's server (40, FIG. 2). Alternatively, when the user has filled out the purchase order screen, at S36 the application launches an e-mail module to send the purchase order data to the manufacturer's server (40, FIG. 2). When the purchase order is received at server 40, the order is confirmed on the user's browser screen or the order is confirmed by a responsive e-mail.

Alternatively, the user personal information (e.g., name, address, shipment method, etc.) may be automatically entered by the application's program. For example, this information may be entered and saved in computer 30 during online registration and modified, if necessary, using the modify settings screen. Step S35 automatically enters the user personal information (including account or credit card numbers), and step S36 is a screen with a single button to confirm the desire to purchase. The user click on the buy now button, then clicks on the confirm purchase order button (step S36) and is e-mailed a purchase or confirmation and receives the part the next day (depending on shipment instructions).

The condition may be used to indicate when a consumable has been exhausted (e.g., paper tray empty) or a consumable has reach a predetermined threshold (e.g., magenta ink level low). Preferably, the condition indicates when the consumable has reached a threshold in time to reorder before the consumable is completely exhausted.

In an alternative embodiment, the application module has a monitor module that is called each time a job is sent to the printer to track how many pages have been printed and/or how much ink has been expended in each color since the last time the consumable has been replenished. The monitor module includes an "inventory sub-module" to recorded each time the consumable has been replenished and to deduct consumption of the consumable as the jobs are printed. The monitor module causes an indication of a status condition to be displayed when the consumables are expected to be below a threshold based on the inventory sub-module. The user can then navigate through the screens to the status screen and order more of the consumable by clicking the "Buy Now" button.

The server 40 may forward an order to a supplier local to the user's location or the server 40 may process the order and ship directly to the user. Server 40 knows the address of the user from the purchase order. With pre-arranged contracts with networks of office supply retailers and mail order houses, server 40 is kept aware of the level of inventory on hand at the retailer, and can confirm availability before sending the shipment order to the retailer.

Furthermore, using "cookie technology" developed for browsers, the application program examines the cookies for office supply retailers that the user has already used for supplies (e.g., when the user buys supplies online from the retailer). Such retailer can become a preferred distributor for the manufacturer's supplies. If accounts are established with the retailers that carry the desired part, the application program may inquire of the user at the time the user clicks on the "Buy Now" button whether the user want to order from the preferred retailer on account.

Figure 8:
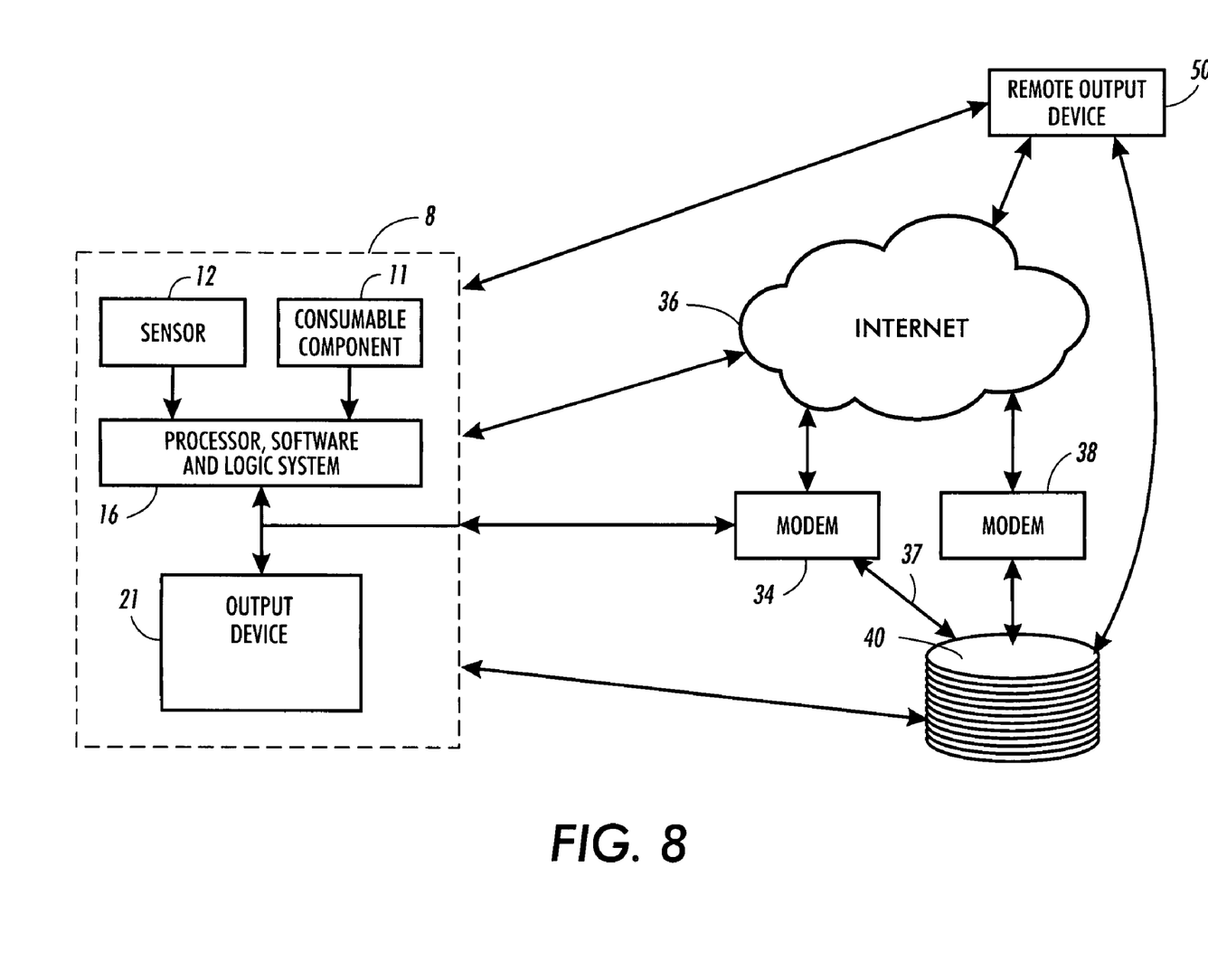
FIG. 8 is a diagram of a system according to the present invention.

Turning now to FIG. 8 is a system for automatic electronic ordering of a consumable component 11 for a marking apparatus 8. Illustrated is an example of a system including a marking apparatus 8 and a remote output device 50 linked together by a communication system. The marking apparatus 8 may include an output device 21 such as a monitor or display, a consumable component 11, a sensor 12, and a processor, software algorithm, and logic system 16. The output device 21 may be used to communicate with a user or a remote output device 50. Alternatively, communications from the marking apparatus 8 may bypass the output device 21. Moreover, the output device 21, sensor 12, and processor, software algorithms, and logic system 16 may be located externally from the marking apparatus 8, for example, in an associated device or in a remote configuration which communicates with the consumable component 11. The marking apparatus 8 or a remote output device 50 may regularly or intermittently interrogate the consumable component 11 for information and then process and communicate such information to another remote output device 50 or server 40. The communication of information may operate via a hard wired connection or a wireless system. The information may be in machine readable format or human readable format. The marking apparatus 8 may include an Internet browser for communication.

A modem 34, Internet connection 36, or server 40 may be used to electronically communicate the information from the marking apparatus 8 to the remote output device 50 regarding the condition of the consumable component 11 and automatically initiate an electronic order for a replacement of the consumable component 11. The threshold conditions of the consumable component 11 may include a measure, timing, or data such as: (1) supply; (2) wear; (3) usage; (4) rate of depletion; (5) rate of wear; (5) predicted date of depletion of supply; (5) predicted date of need of consumable component 11; (6) delivery schedule of consumable component; and (7) statistical data for consumable component 11.

The marking apparatus 8 may electronically initiate a purchase offer, electronically receive an acceptance of the purchase offer, and electronically form a contract with a supplier for purchase of the replaceable part or consumable component 11. The electronic transaction may include use of an electronic signature using, for example, digital technology. The system may be used in copy, printing, xerographic, electrostatographic, and marking apparatus. The consumable part may include a ink, ink cartridge, toner, toner cartridge, paper, photoreceptor cartridge, and printhead.

Moreover, the marking apparatus 8 device may communicate information relating to the condition of the consumable component 11 to a second device, supplier, user, or third party. The information may relate to:

(1) a present condition of the consumable component 11; (2) a prediction of a future condition of the consumable component 11; (3) an inquiry relating to the consumable component 11; or (4) a purchase order of the consumable component 11. The marking apparatus 8 may predict a future condition of the consumable component 11 prior to sending a signal. The marking apparatus 8 may be programmed to communicate an offer to purchase a consumable component 11 and receive an acceptance of an offer to purchase a consumable component 11 prior to occurrence of certain condition. The consumable component 11 may be received by the user and installed in the marking apparatus 8 between occurrence of certain conditions. The marking apparatus 8 may request delivery of a consumable component 11 to a specified location. The marking apparatus 8 may include identified indicia relating to purchase information for the replaceable part such that the logic then automatically initiates an offer to purchase the replaceable part. The indicia may includes a method of shipment, shipping address, phone number, address, method of payment, authorization code, and credit card account number.

The system advantageously automates ordering of consumable supplies and replaceable parts for a marking apparatus 8, analog or digital. An order may be initiated based on a condition code indicating that the consumable component 11 has or will soon reach a predetermined threshold. Then, the system automatically sends an offer to purchase the replacement. This system includes sensing or predicting a condition in a marking apparatus, sending that condition to a computer or processor, and launching a communications to a second device to electronically offer to purchase the replacement part. The marking apparatus 8 may include all or part of the features and functions as previously described for FIGS. 2–7.

While this invention has been described in conjunction with various embodiments, it is evident that many alternatives, modifications, and variations thereof will be apparent to those skilled in the art. Accordingly, it is intended to embrace all such alternatives, modifications, and variations and their equivalents.

What is claimed is:

1. A method of ordering a part of an apparatus comprising:
    monitoring electronically a condition of a replaceable part in a first device, the replaceable part having: a first condition upon installation; at least one intermediate condition after use; and a third condition when a replacement part is substantially necessary;
    launching a communications link to access a URL address, the URL address defined by a condition of the part;
    automatically launching an electronic communication link to a URL address of a computer, the URL address defined by a condition of the replaceable part;
    electronically sending a signal to a second device, the signal automatically electronically offering to purchase a replaceable part upon identification of at least one of the first condition, second condition, and third condition in the replaceable part; and
    sending a digital electronic signature associated with the offering to purchase the replaceable part.

2. The method of claim 1 further comprising predicting a condition of the part prior to the electronically sending the signal.

3. The method of claim 2 further comprising receiving electronically an acceptance of the offer to purchase the replaceable part.

4. The method of claim 3 further comprising installing the replaceable part prior to occurrence of the third condition.

5. The method of claim 3 further comprising delivering the replaceable part to the first device when monitoring indicates the condition of the part is between about the first condition and the third condition.

6. The method of claim 3 further comprising providing information relating to the signal to at least one of a user, a supplier, and a third party.

7. The method of claim 6 wherein the information relates to at least one of: (1) a present condition of the part; (2) a prediction of a future condition of the part; (3) an inquiry; and (4) an offer to purchase.

8. The method of claim 1 further comprising:
    using a sensor and software system to perform monitoring and predicting of a condition of the part.

9. The method of claim 1 wherein the first device is interactive.

10. The method of claim 1 further comprising:
    displaying a purchase order screen including data relating to the part automatically filled out on the purchase order screen based on an identified condition; and
    sending the data electronically to a supplier of the part after personal information data is automatically entered by an application program into the purchase order screen.

11. The method of claim 10 further comprising:
    sending data to the supplier after a user enters data.

12. The method of claim 6 wherein the information further relates to at least one of: (1) present supply of a consumable; (2) wear of a consumable; (3) usage of the part; (4) rate of depletion of a consumable; (5) rate of wear of the consumable; (6) predicted date of depletion of the consumable; (7) a predicted date of need of a consumable; (8) delivery schedule of a consumable; and (9) statistical data relating to a part.

13. A method of ordering a part of an apparatus comprising:
    identifying electronically a condition in an apparatus;
    automatically launching an electronic communications to initiate at least one of an inquiry and an offer to purchase based on the condition to a URL address of a computer associated with a condition of the part. the URL address defined by a condition of the part;
    displaying a purchase order screen including a part number automatically filled out on the purchase order screen based on the identified condition;
    sending an electronic purchase order for the part using the URL address of a computer associated with the condition of the part; and
    sending a digital electronic signature associated with the electronic purchase order.

14. A method of ordering a part for a marking device comprising:
 sensing a condition of a part in a marking device, the marking device adapted to predict a code indicative of a threshold of a consumable in the part;
 automatically launching an electronic communication to a URL address of a computer associated with a condition of the part, the URL address defined by a condition of the replaceable part;
 sending an electronic purchase offer for a replacement of the consumable part using at least one of the URL address of the computer associated with a condition of the part and a derivative of the URL address associated with the condition of the part; and
 sending a digital electronic signature associated with the electronic purchase offer.

15. The method of ordering a part of claim 14 wherein the consumable part is functionally associated with a sensor and software system to sense and predict a condition in the device and to electronically communicate information, the sensor and software system including logic adapted to initiate a purchase order defined by the condition.

16. A method of ordering a part of an imaging apparatus comprising:
 identifying electronically a condition in a consumable part, the consumable part having a first condition upon installation, at least one intermediate condition after use, and a third condition when a replacement of the consumable part is substantially necessary; and
 using a software and sensor system associated with the apparatus to at least one of: (a) electronically monitor the condition of the consumable part; (b) electronically predicting the condition of the consumable part; and after least one of (a) and (b); (c) automatically launch a communication to a URL address of a computer associated with a condition of the consumable part upon at least one of an occurrence and a prediction of at least one of the first condition, intermediate condition, and third condition, the URL address defined by a condition of the part;
 sending at least one of an inquiry and an offer to purchase a replacement of the consumable part using at least one of the URL address of the computer associated with a condition of the part and a derivative of the URL address associated with the condition of the part; and
 sending a digital electronic signature associated with at least one of the inquiry and the offer to purchase.

17. The method of ordering a part of claim 16 further comprising receiving electronically an acceptance of the offer to purchase.

18. The method of ordering a part of claim 16 wherein the communication further relates to at least one of: (1) present supply of a consumable; (2) wear of a consumable; (3) usage of the part; (4) rate of depletion of a consumable; (5) rate of wear of the consumable; (6) predicted date of depletion of the consumable; (7) a predicted date of need of a consumable; (8) delivery schedule of a consumable; and (9) statistical data relating to a part.

19. The method of ordering a part of claim 1 wherein the electronically sending of the signal to the second device is a wireless communication.

* * * * *

UNITED STATES PATENT AND TRADEMARK OFFICE
CERTIFICATE OF CORRECTION

PATENT NO. : 6,985,877 B1  
DATED : January 10, 2006  
INVENTOR(S) : Ken Hayward et al.

Page 1 of 1

It is certified that error appears in the above-identified patent and that said Letters Patent is hereby corrected as shown below:

<u>Column 9,</u>  
Line 55, Claim 1 should read:
1. A method of ordering a part of an apparatus comprising:
   monitoring electronically a condition of a replaceable part in a first device, the replaceable part in a first device, the replaceable part having: a first condition upon installation; at least one intermediate condition after use; and a third condition when a replacement part is substantially necessary;
   automatically launching an electronic communication link to a URL address of a computer, the URL address defined by a condition of the replaceable part;
   electronically sending a signal to a second device, the signal automatically electronically offering to purchase a replaceable part upon identification of at least one of the first condition, second condition, and third condition in the replaceable part; and
   sending a digital electronic signature associated with the offering to purchase the replaceable part.

Signed and Sealed this

Eleventh Day of April, 2006

JON W. DUDAS  
*Director of the United States Patent and Trademark Office*

UNITED STATES PATENT AND TRADEMARK OFFICE
CERTIFICATE OF CORRECTION

PATENT NO. : 6,985,877 B1  
APPLICATION NO. : 09/662284  
DATED : January 10, 2006  
INVENTOR(S) : Ken Hayward et al.

Page 1 of 1

It is certified that error appears in the above-identified patent and that said Letters Patent is hereby corrected as shown below:

<u>Column 9,</u>  
Line 55, Claim 1 should read:
1. A method of ordering a part of an apparatus comprising:
 monitoring electronically a condition of a replaceable part in a first device, the replaceable part having: a first condition upon installation; at least one intermediate condition after use; and a third condition when a replacement part is substantially necessary;
 automatically launching an electronic communication link to a URL address of a computer, the URL address defined by a condition of the replaceable part;
 electronically sending a signal to a second device, the signal automatically electronically offering to purchase a replaceable part upon identification of at least one of the first condition, second condition, and third condition in the replaceable part; and
 sending a digital electronic signature associated with the offering to purchase the replaceable part.

This certificate supersedes Certificate of Correction issued April 11, 2006.

Signed and Sealed this

Fifth Day of September, 2006

JON W. DUDAS  
*Director of the United States Patent and Trademark Office*